(12) United States Patent
Haub et al.

(10) Patent No.: US 9,736,790 B1
(45) Date of Patent: Aug. 15, 2017

(54) TRANSCEIVER SYSTEM SUPPORTING TRANSMITTER SELF CALIBRATION AND METHODS OF PERFORMING THE SAME

(71) Applicant: Spreadtrum Communications USA Inc., San Diego, CA (US)

(72) Inventors: David Haub, San Deigo, CA (US); Lon Christensen, San Diego, CA (US); Zebin Wang, San Diego, CA (US)

(73) Assignee: Spreadtrum Communications USA, Inc., San Diego, CA (US)

( * ) Notice: Subject to any disclaimer, the term of this patent is extended or adjusted under 35 U.S.C. 154(b) by 0 days.

(21) Appl. No.: 15/090,056

(22) Filed: Apr. 4, 2016

(51) Int. Cl.
| | | |
|---|---|---|
| *H04B 7/00* | (2006.01) |
| *H04W 52/24* | (2009.01) |
| *H04B 1/40* | (2015.01) |
| *H04B 10/293* | (2013.01) |
| *H04W 52/00* | (2009.01) |

(52) U.S. Cl.
CPC ............ *H04W 52/245* (2013.01); *H04B 1/40* (2013.01); *H04B 10/293* (2013.01); *H04B 10/2931* (2013.01); *H04W 52/00* (2013.01)

(58) Field of Classification Search
CPC ...... H04W 52/245; H04W 52/00; H04B 1/40; H04B 10/2931; H04B 10/293
USPC .......... 455/522, 67.14, 68, 69, 73, 88, 115.2
See application file for complete search history.

(56) References Cited

U.S. PATENT DOCUMENTS

| | | | | |
|---|---|---|---|---|
| 6,018,650 A * | 1/2000 | Petsko | ................... | H04W 52/10 455/232.1 |
| 6,498,929 B1 * | 12/2002 | Tsurumi | ................. | H03D 3/008 327/307 |
| 7,558,553 B1 * | 7/2009 | Raissinia | ............. | H04B 17/318 455/232.1 |
| 8,761,536 B2 * | 6/2014 | Washio | ................... | G06T 5/002 358/448 |
| 8,787,215 B1 * | 7/2014 | Khlat | .................... | H04B 17/102 370/280 |
| 9,337,940 B2 * | 5/2016 | Fu | .......................... | H04B 15/00 |
| 2001/0016002 A1 * | 8/2001 | Shim | ................ | G11B 20/10009 375/232 |
| 2003/0068991 A1 * | 4/2003 | Lee | ....................... | H03G 3/3036 455/126 |
| 2004/0085929 A1 * | 5/2004 | Azuma | .................. | H04B 17/12 370/329 |
| 2005/0113030 A1 * | 5/2005 | Gaikwad | .............. | H04B 17/318 455/67.11 |

(Continued)

*Primary Examiner* — Dominic Rego
(74) *Attorney, Agent, or Firm* — Ballard Spahr LLP

(57) ABSTRACT

A self-calibrating transceiver includes a transmitter chain, a receiver chain, a base band processor, and a calibration control state machine. The state machine is in electrical communication with the transmitter chain, the receiver chain, and the base band processor, and is configured for enabling the receiver chain and setting the receiver chain and the transmitter chain to corresponding frequencies. The state machine stores one or more transmitter power and power amplifier gain mode settings, and for each setting, sets the transmitter gain and power amplifier gain mode. The transmitter chain transmits a signal, the receiver chain receives the transmitted signal, and the baseband processor measures a received signal strength indicator (RSSI) of the received signal. The state machine further adjusts the transmitter output power based on the measured RSSI.

19 Claims, 6 Drawing Sheets

(56) References Cited

U.S. PATENT DOCUMENTS

| | | | | |
|---|---|---|---|---|
| 2005/0164648 | A1* | 7/2005 | Gannholm | H04B 17/14 455/84 |
| 2006/0009171 | A1* | 1/2006 | Xu | H04B 1/0475 455/114.2 |
| 2006/0083206 | A1* | 4/2006 | Min | H04B 17/318 370/338 |
| 2006/0182017 | A1* | 8/2006 | Hansen | H04B 7/02 370/208 |
| 2006/0223558 | A1* | 10/2006 | Behzad | H04B 1/0082 455/502 |
| 2007/0183479 | A1* | 8/2007 | Noll | H04B 17/21 375/132 |
| 2008/0152047 | A1* | 6/2008 | Rowe | H04L 5/06 375/343 |
| 2011/0207418 | A1* | 8/2011 | Laroia | H03D 3/008 455/75 |
| 2011/0234315 | A1* | 9/2011 | Chen | H03F 1/3229 330/149 |
| 2012/0096956 | A1* | 4/2012 | Sabarinathan | G01L 9/0076 73/862.541 |
| 2012/0196546 | A1* | 8/2012 | Ly-Gagnon | H03F 3/24 455/73 |
| 2014/0073275 | A1* | 3/2014 | El-Hassan | H04B 17/13 455/115.3 |
| 2014/0314175 | A1* | 10/2014 | Nilsson | H04B 1/0475 375/295 |
| 2014/0370823 | A1* | 12/2014 | Yu | H04B 17/14 455/73 |
| 2015/0263532 | A1* | 9/2015 | Van Wageningen | H02J 5/005 307/104 |

* cited by examiner

TRANSCEIVER SYSTEM SUPPORTING TRANSMITTER SELF CALIBRATION AND METHODS OF PERFORMING THE SAME

BACKGROUND

Transmitters, receivers, and transceivers for broadcast devices, such as cellular phones, are designed using radio frequency (RF) and analog blocks that have several imperfections. Various functional design restrictions, as well as broadcasting requirements and best practices, require that the various components of the cellular transmitter, receiver, and/or transceiver meet difficult design specifications.

The issue of meeting these design specifications can be addressed through analog design methods. That is, either extra circuitry and/or extra design time are used in order to achieve the required performance. The extra circuitry and/or circuit methods used to address these issues can often lead to more power consumption in the final design. Additionally, the added circuitry and/or circuit design involves the designer spending extra design time applying complicated design techniques in order to reduce the variation in output. Often, this might involve temperature and frequency compensating circuits that add to the complexity and die area of the design.

The issues can also be addressed using factory calibration. Using this method, less time is spent on additional analog design and/or design time in exchange for doing compensation for the imperfections in mass production. In order to support this, digital compensation circuits are added that can compensate for the various analog imperfections. For example, simple digital circuits can be added to offset imperfect analog signals. The compensation circuits can be small and easy to design, thus representing an improvement over using more complicated analog-only circuit design. However, in order to support the various compensations, this method requires factory calibration, meaning that various test signals must be injected and measured during mass production of the circuitry in the factory to determine the offsets to be used in the compensation circuits. Therefore, the negative aspect of this method is increased factory calibration time, which increases the cost of the end product.

These and other shortcomings are addressed in the description below.

SUMMARY

It is to be understood that both the following general description and the following detailed description are exemplary and explanatory only and are not restrictive. Provided are methods and systems for self calibration of at least a transmitter chain in a transceiver.

In a first aspect, a self-calibrating transceiver includes a transmitter chain, a receiver chain, a base band processor, and a calibration control state machine. The state machine is in electrical communication with the transmitter chain, the receiver chain, and the base band processor, and can enable the receiver chain and set the receiver chain and the transmitter chain to corresponding frequencies. The state machine can store one or more transmitter power and power amplifier gain mode settings, and for each setting, can set the transmitter gain and power amplifier gain mode. The transmitter chain can transmit a signal, the receiver chain can receive the transmitted signal, and the baseband processor can measure a received signal strength indicator (RSSI) of the received signal. The state machine can further adjust the transmitter output power based on the measured RSSI.

In a second aspect, a self-calibrating transceiver can include a transmitter chain comprising a digital front end (DFE), a receiver chain, a baseband processor, and a calibration control state machine. The state machine can be in electrical communication with the transmitter chain, the receiver chain, and the baseband processor, can enable the receiver chain and can set the receiver chain and the transmitter chain to corresponding frequencies. The calibration control state machine can further store a plurality of trial offset values for a direct current offset adder. For each of the plurality of stored trial offset values, the offset can be provided to a direct current offset adder, a test signal can be transmitted, and the receiver chain can receive the test signal. The baseband processor can measure a received signal strength indicator (RSSI) value and transmit the measured RSSI value to the calibration control state machine. The calibration control state machine can further determine a direct current transmitter offset based on the measured RSSI values and applying the determined offset to the DFE.

In a third aspect, a self-calibrating transceiver can include a transmitter chain comprising a digital front end (DFE) and a direct current offset adder, a receiver chain, a baseband processor, and a calibration control state machine in electrical communication with the transmitter chain, the receiver chain, and the base band processor. The calibration control state machine can enable the receiver chain and set the receiver chain and the transmitter chain to corresponding frequencies. The calibration control state machine can store one or more transmitter power and power amplifier gain mode settings and a plurality of trial offset values for the direct current offset adder. For each of the one or more transmitter power and power amplifier gain mode settings, the transmitter gain and power amplifier gain mode can be set, the transmitter chain can transmit a signal, the receiver chain can receive the transmitted signal, and the baseband processor can measure a first received signal strength indicator (RSSI) of the received signal. The calibration control state machine can adjust the transmitter output power based on the measured first RSSI. For each of the plurality of stored trial offset values, the offset value can be transmitted to a direct current offset adder, a test signal can be transmitted by the transmitter chain, the test signal can be received at the receiver chain, a second RSSI value can be measured at the baseband processor, and the measured second RSSI value can be transmitted to the calibration control state machine. The calibration control state machine can determine a direct current transmitter offset based on the measured second RSSI values and can apply the determined offset to the DFE Additional advantages will be set forth in part in the description which follows or may be learned by practice. The advantages will be realized and attained by the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
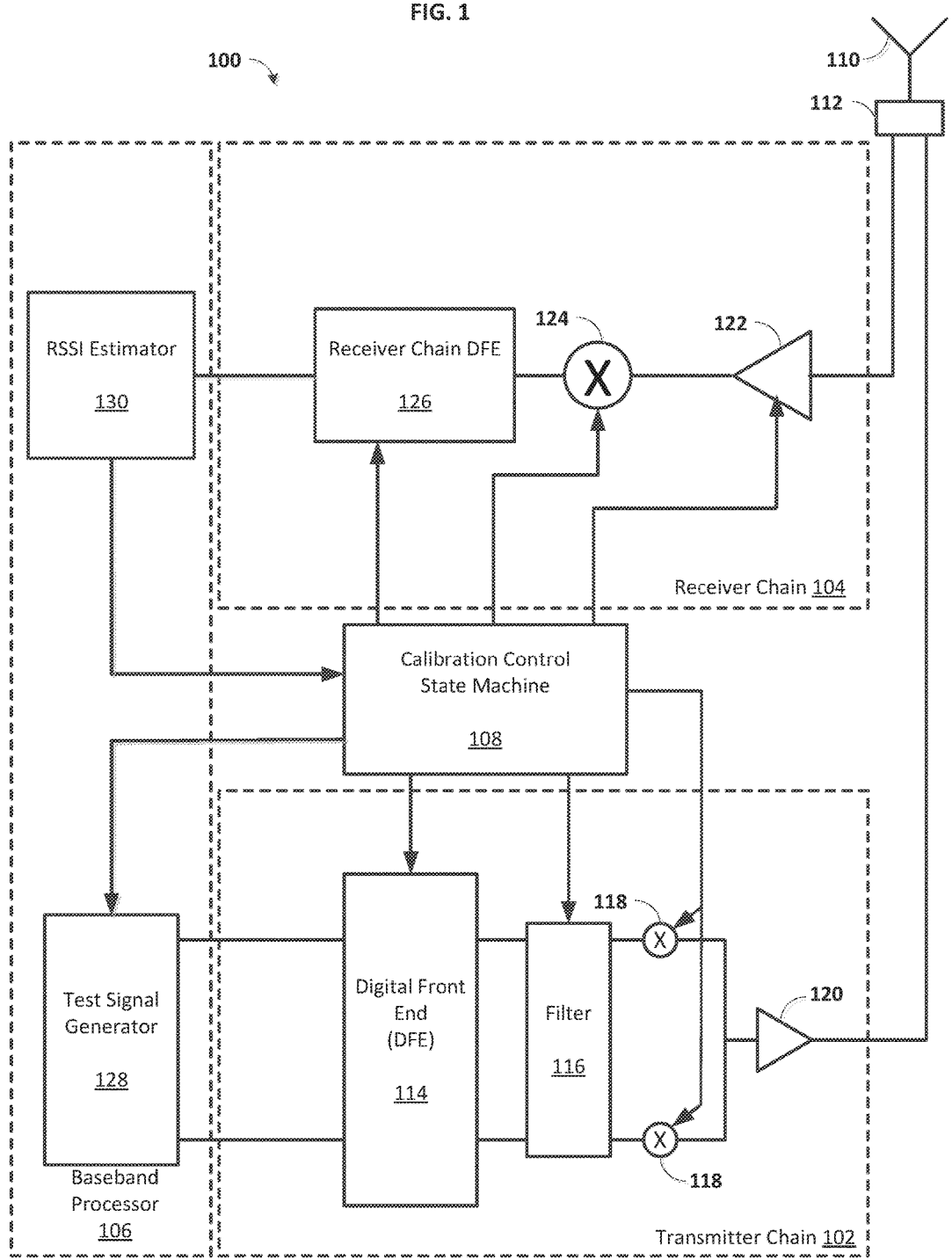
FIG. 1 is a schematic diagram of a self calibrating transceiver.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The terms "optional" or "optionally" is used when the subsequently described event or circumstance may or may not occur, and that the description includes instances where said event or circumstance occurs and instances where it does not.

Throughout the description and claims of this specification, the word "comprise" and variations of the word, such as "comprising" and "comprises," is defined as "including but not limited to," and is not intended to exclude, for example, other components, integers or sub-processes. "Exemplary" is defined as "an example of" and is not intended to convey an indication of an ideal embodiment, "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, sub-processes in disclosed methods. Thus, if there are a variety of additional sub-processes that can be performed it is understood that each of these additional sub-processes can be performed with any specific embodiment or combination of embodiments of the disclosed methods.

The present methods and systems may be understood more readily by reference to the following detailed description of embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block representing a digital component of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a method of implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational sub-processes to be performed on the computer or other programmable apparatus to produce a computer-implemented process such that the instructions that execute on the computer or other programmable apparatus provide sub-processes for implementing the functions specified in the flowchart block or blocks.

Accordingly, blocks of the block diagrams and flowchart illustrations support combinations of methods of performing the specified functions, combinations for performing the specified functions and program instruction methods of performing the specified functions. It will also be understood that each block of the block diagrams and flowchart illustrations, and combinations of blocks in the block diagrams and flowchart illustrations, can be implemented by special purpose hardware-based computer systems that perform the specified functions or sub-processes, or combinations of special purpose hardware and computer instructions.

The present disclosure relates to transceivers that provide an environment in which a transmitter chain can be self-calibrated. For example, the transmitter chain can be calibrated without the need for expensive time in factory calibration, and without the added expense of analog circuit design, or the added die area that such circuitry would consume. Cellular receivers are designed using RF analog blocks that have several imperfections. As examples, transmitter imperfections that can adversely affect the cellular system include output power setting, filter corner, quadrature imbalance, local oscillator (LO) leakage, and adjacent channel leakage ratio (ACLR).

Output power setting can affect a transceiver because the transceiver is required to have an accurate absolute power and, even more importantly, an accurate relative power (e.g., power in next time period compared to the previous time period) at the antenna. The absolute power requirement is generally fairly loose (e.g., WCDMA requires an absolute power requirement of +/−9 dB). The relative power setting requirement can be much more precise (e.g., WCDMA requires a 1 dB step with +/−0.5 dB) since the base station needs to be able to accurately adjust the power level of the various device (e.g., cellular phones, tablet computers, and the like) accessing the system. Filter corner affects the transceiver since precise filter bandwidth is needed. If the filter bandwidth is too wide, baseband noise and alias products are not adequately filtered; if the filter bandwidth is too narrow, a desired transmit signal is distorted and/or can fail certain spectral flatness requirements. Quadrature imbalance affects the transceiver since imbalance in the quadrature distorts the transmitted signal. LO leakage affects the transceiver because, for some systems (e.g., WCDMA and TDSCDMA), the leakage can distort the transmit signal (as measured by error vector magnitude) and/or because, for some systems (e.g., LTE), phones must meet strict specifications for this metric. In the former case, the LO leakage level adversely effects the ability of the system to demodulate the transmitter signal. In both the former and latter case, incoming LO leakage from all the various connected devices can accumulate at the base station, thus degrading an ability of the base station receiver to demodulate various users' signals successfully. Therefore, all cellular systems incorporate some method of verifying that device designs meet strict LO leakage requirement. ACLR affects the transceiver since interference generated in the transmitter chain produces unwanted distortion on channels in use by other devices in a system. Accordingly, strict specifications exist regarding allowed levels of ACLR. Therefore, the problem solved by this invention is how to deal with these imperfections in an efficient manner Thus, each of the items listed above can adversely affect a broadcast (e.g., cellular) system.

The disclosed transceiver system utilizes existing hardware in the transceiver to perform self calibration. The term self calibration is used here to distinguish from factory calibration. Factory calibration requires the characterization of test signals using external test equipment during mass production in order to measure and then compensate for analog imperfections. In contrast, self calibration (as used herein) uses existing hardware (e.g., a receiver chain inside the transceiver) to measure test signals after powering up the transceiver (and/or a device that comprises the transceiver) to compensate for analog imperfections. Thus, self calibration has advantages as compared to factory calibration. First, the test signal measurement is done during transceiver power up, reducing or eliminating factory calibration time and reducing costs associated with producing the transceiver and/or the device comprising the transceiver (e.g., a cellular phone). Second, test signals can be generated and measured on one or more (e.g., each) power up of the transceiver or the device comprising the transceiver, allowing analog imperfections to be tracked over time and compensated for accordingly. This can improve performance of the transceiver and the device that uses the transceiver (e.g., the cellular phone).

As discussed above, in some aspects the self calibration system uses the existing receiver chain to measure transmitted signal(s). In other aspects, it is possible to design a specific detection receiver to perform the measurements needed for calibration.

Moreover, a path allowing the transmit signal to leak into the receiver is advantageous to perform the self calibration. This leakage typically exists on conventional device designs, and can exist due to one or more of a duplexer, a switch, a coupler, antenna-to-antenna leakage, or a coupling in a printed circuit board (PCB). For many devices, the transmitter chain and a receiver chain are coupled to an antenna by a duplexer. Rejection of the transmitter signal is finite, and thus an adequate amount of leakage is present in order to perform calibration. For other devices operating in modes such as time division duplex (TDD) mode, a switch can be used to couple the receiver chain and the transmitter chain to the antenna. Because the switch is connected to both transmitter chain and the receiver chain, there is adequate leakage for calibration. In some devices, a coupler (e.g., a physical component that intentionally couples the transmitter chain and the receiver chain) can be used to create leakage for self calibration. Leakage from one antenna to another can provide a test signal path that could be used for some level of self calibration. Leakage can be created in a PCB that would couple a transmitter chain to a receiver chain thus allowing signal leakage to be used for self-calibration. Similarly, an integrated circuit can be designed to couple the transmitter chain and the receiver chain to support self calibration. The circuit design can be achieved directly (e.g., by including one or more switches) or indirectly (e.g., through layout such that coupling is created by physical proximity).

As discussed with regard to factory calibration, self calibration can require some combination of analog and/or digital circuits to offset the imperfections in the analog design. A state machine comprising a microprocessor combined with some software can perform calibration algorithms. The calibration control state machine can manage the self calibration process by introducing test vectors, taking measurements, and applying the requisite compensations.

As shown in FIG. 1, a transceiver 100 includes a transmitter chain 102, a receiver chain 104, and a baseband processor 106. The transceiver 100 can further comprise a calibration control state machine 108 connected to one or more of the transmitter chain 102, the receiver chain 104, and the baseband processor 106. The transmitter chain 102 and receiver chain 104 can be in electrical communication with an antenna 110 via a connecting device 112. In some aspects the connecting device 112 can comprise one or more of a switch and a duplexer.

The transmitter chain 102 can comprise a transmitter digital front end (DFE) 114, a filter 116, pair of local oscillators 118, and an amplifier 120, arranged in series such that the output of the amplifier 120 is connected to the connecting device 112. In some aspects, one or more of the DFE 114, the filter 116, the local oscillators 118, and the power amplifier 120 can be in communication with the calibration control state machine 108.

The receiver chain 104 can comprise an amplifier 122 (e.g., a low noise amplifier or other amplifier) connected to a local oscillator 124. The oscillator 124 can be connected to a DFE 126 for the receiver chain. The output of the receiver chain 104 is then provided from the DFE 126 to the baseband processor 106.

The baseband processor 106 can manage one or more functions of the transmitter chain 102 and/or the receiver chain 104. In some aspects, the baseband processor can comprise a test signal generator 128 in communication with the transmitter DFE 114. The baseband processor 106 can further comprise a received signal strength indicator (RSSI) estimator 130 that can receive information from the receiver chain 104. The baseband processor 106 can provide information to one or more of the transmitter chain 102 and the calibration control state machine 108, and can receive information from one or more of the receiver chain 104 and the calibration control state machine 108.

The calibration control state machine 108 is in electrical communication with each of the transmitter chain 102, the receiver chain 104, and the baseband processor 106. In some aspects, the calibration control state machine 108 can be used to control one or more properties of one or more of the transmitter chain 102, the receiver chain 104, and the baseband processor 106. The calibration control state machine 108 typically comprises a variety of computer readable media. Exemplary readable media can be any available media that is accessible by the calibration control state machine 108 and comprises, for example and not meant to be limiting, both volatile and non-volatile media, removable and non-removable media. The system memory can comprise computer readable media in the form of volatile memory, such as random access memory (RAM), and/or non-volatile memory, such as read only memory (ROM). The system memory typically can comprise data such as calibration control data and/or program modules such as an operating system and calibration control software that are accessible to and/or are operated on by the calibration control state machine 108.

In some aspects, the DFE 114 and/or the baseband processor 106 can be used to adjust one or more properties of the transmitter chain 102 as part of self calibration.

As a particular example, the DFE 114 can be used to correct for transmitter chain quadrature imbalance. Transmitter chain quadrature imbalance is one contributor to transmitter chain signal to noise ratio (SNR). The receiver chain 104 can be used as a detection path, thus the receiver chain path should be calibrated before calculating transmitter chain mismatches to provide more accurate results. In response to a signal from the calibration control state machine 108, the test signal generator 128 generates test signals at different offset frequencies relative to the transmitter chain local oscillators 118. The receiver chain 104 can sample each corresponding test signal, which can be used to calculate the transmitter chain phase and gain mismatches. After the receiver has measured the phase and gain mismatches associated with each of the offsets; a compensation value can be applied to the transmitter chain 102. In some aspects, the compensation value can be applied to the RF DFE (Radio Frequency Digital Front-End) 114.

The phase and gain mismatches can comprise an in-phase channel mismatch and a quadrature channel mismatch. The recorded I/Q waveforms can be noted I'(t) and Q'(t); the gain and phase mismatch can be calculated with the following equations:

$$\begin{cases} g_{estTX} = \sqrt[2]{\dfrac{E[I'(t)^2]}{E[Q'(t)^2]}} \\ \theta_{estTX} = \sin^{-1}\left[\dfrac{E[I'(t) \cdot Q'(t)]}{E[I'(t)^2]} \cdot g_{estTX}\right] \end{cases} \quad \text{equ. 1}$$

In which E[ ] is the mathematical expectation function, $g_{estTX}$ is the gain imbalance estimation, and $\theta_{estTX}$ is the phase imbalance estimation.

There are multiple ways to compensate for the frequency dependent phase and gain imbalances. A first approach is to determine (e.g., calculate) an average of gain and phase imbalance over plural frequencies and compensate with a constant offset and a delay difference in in-phase and quadrature channel equalizers at the DFE 114. As a particular example, the averages of the gain and phase imbalance over offset frequencies, $g_{avgTX}$E[$g_{estTX}$($f_t$)], ($f_t$ is the test signal offset frequency) and $\theta_{avgTX}$½[$\theta_{extTX}$(1 MHz)+$\theta_{estTX}$(−1 MHz)] can be used as the constant imbalances to be applied in the compensation process.

The corrected I/Q waveform, $I_{correced}(t)$ and $Q_{correced}(t)$ can be obtained by applying a correction matrix to the original I'(t) and Q'(t)

$$\begin{pmatrix} I_{correced}(t) \\ Q_{correced}(t) \end{pmatrix} = \begin{pmatrix} \cos\dfrac{-\theta_{avgTX}}{2} & \sin\dfrac{-\theta_{avgTX}}{2} \\ g \cdot \sin\dfrac{-\theta_{avgTX}}{2} & g \cdot \cos\dfrac{-\theta_{avgTX}}{2} \end{pmatrix} \begin{pmatrix} I'(t) \\ Q'(t) \end{pmatrix}$$

A frequency dependency of phase imbalance can be approximated with a linear-phase response, the time delay can be calculated as:

$$\tau = \dfrac{\tfrac{1}{2} \cdot [(\theta_{estTX}(f_1) - \theta_{estTX}(f_2)) + (\theta_{estTX}(-f_2) - \theta_{estTX}(-f_1))]}{(f_1 - f_2)}$$

This time delay difference can be introduced into the equalizer in the DFE 114 on I and Q channels, to compensate for the phase mismatch.

A second approach to compensate for quadrature imbalances can comprise using a programmable complex equalizer within the DFE 114. The imbalances can be modeled as an complex filter, with the frequency response of H($f_t$)= $g_{estTX}$($f_t$)·$e^{j\theta_{estTX}F_t}$, in which $g_{estTX}$($f_t$) and $\theta_{estTX}$($f_t$) are gain and phase imbalances calculated from equ. 1. A complex FIR equalizer will be applied onto the I and Q channels with the response of $$H_{eq}(f_t) = \dfrac{1}{g_{estTX}(f_t)} \cdot e^{-j\theta_{estTX}(f_t)},$$

to compensate for the imperfections of the analog circuitry.

Figure 2:
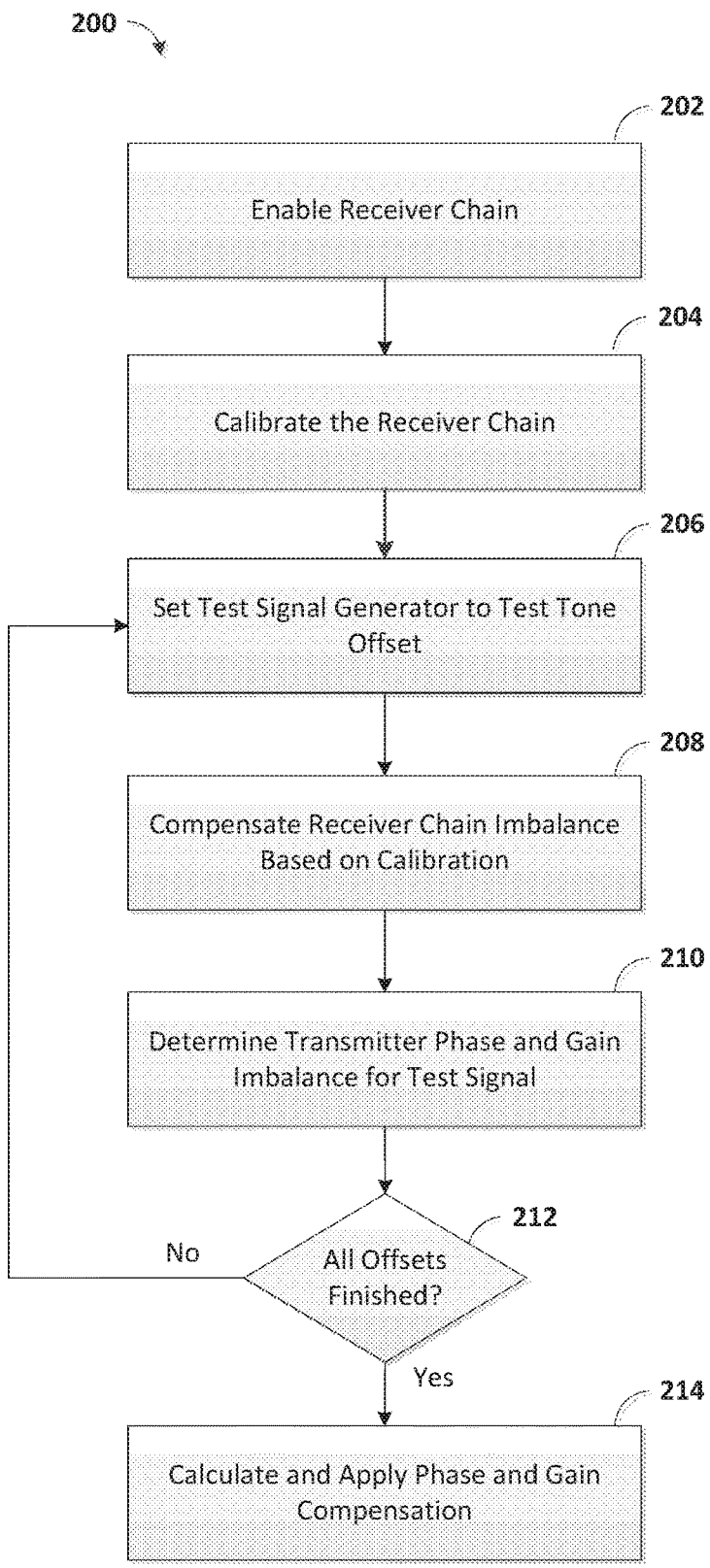
FIG. 2 shows a method of transceiver self calibration.

As a particular, example, FIG. 2 shows a method 200 for quadrature imbalance self calibration of a transmitter chain in a transceiver. In block 202, a receiver chain (e.g., the receiver chain 104) can be enabled. As an example, a calibration control state machine (e.g., the calibration control state machine 108) can enable the receiver chain. The receiver chain can be set such that the center frequency of the receiver chain corresponds to the transmitter frequency to be calibrated.

In block 204, the receiver chain can be calibrated. In some aspects, at least the quadrature imbalance of the receiver chain can be calibrated. As an example, a compensation value associated with the receiver chain can be generated.

In block 206, a test signal generator (e.g., the test signal generator 128) can be set to a predetermined offset from among a group of one or more test signal offsets. In an aspect, the calibration control state machine can set the test signal generator based on one or more predefined offsets.

In block 208, the receiver chain compensation value can be applied to a test signal. In an aspect, the compensation value can be applied to the test signal received at the receiver chain.

The block 210, a phase and gain imbalance value can be measured. In an aspect, the phase and gain imbalance can be measured at the receiver chain. In some aspects, the phase and gain imbalance are measured after the receiver chain compensation value has been applied.

In block 212, it can be determined whether each of a plurality of test signals has been generated. If not all test signals have been generated, the method can return to block 206 using a new test signal. Once all test signals are complete, the method can continue to block 214.

In block 214, transmitter phase and gain compensation values can be determined. In some aspects, the transmitter phase and gain compensation values can be determined based on the one or more determined phase and gain imbalances associated with the one or more test signals. The transmitter phase and gain compensation values can be determined by, for example, the calibration control state machine. The calibration control state machine can adjust the quadrature balance of the transmitter chain. In some aspects, adjusting the quadrature balance can comprise applying the determined phase and gain calculation values to the transmitter chain, such as to a DFE (e.g., DFE 114) in the transmitter chain.

As another example, the DFE 114 and/or the baseband processor 106 can be used to correct a transmitter chain output power setting. An accurate relative transmitter chain power step (e.g., a power difference between transmitter chain gain settings) can be required by modern mobile communication network standards. In the transmitter chain output power self calibration, the transmitter can transmit a test signal while iterating through one or more transmitter chain power and amplifier gain modes. The receiver chain 104 can be used as a detection path. A received signal strength index (RSSI) value associated with each transmitter chain power and amplifier gain mode setting can be measured (e.g., using the receiver chain DFE 126 and/or the baseband processor 106).

In some aspects, the RSSI value can comprise a squared average value of the captured receiver chain samples. In some aspects, the calibration control state machine 108 can determine gain values having power nearest to a desired output power for each of the transmitter chain power settings, and can create a linear transmitter chain gain table based on the determined gain values. In other aspects, the calibration control state machine 108 can calculate a difference between a measured transmit power and an ideal transmit power, and use digital gain to compensate for the analog/RF imperfections. For example, the calibration control state machine 108 can adjust a digital gain of the DFE 114 to calibrate the gain.

Figure 3:
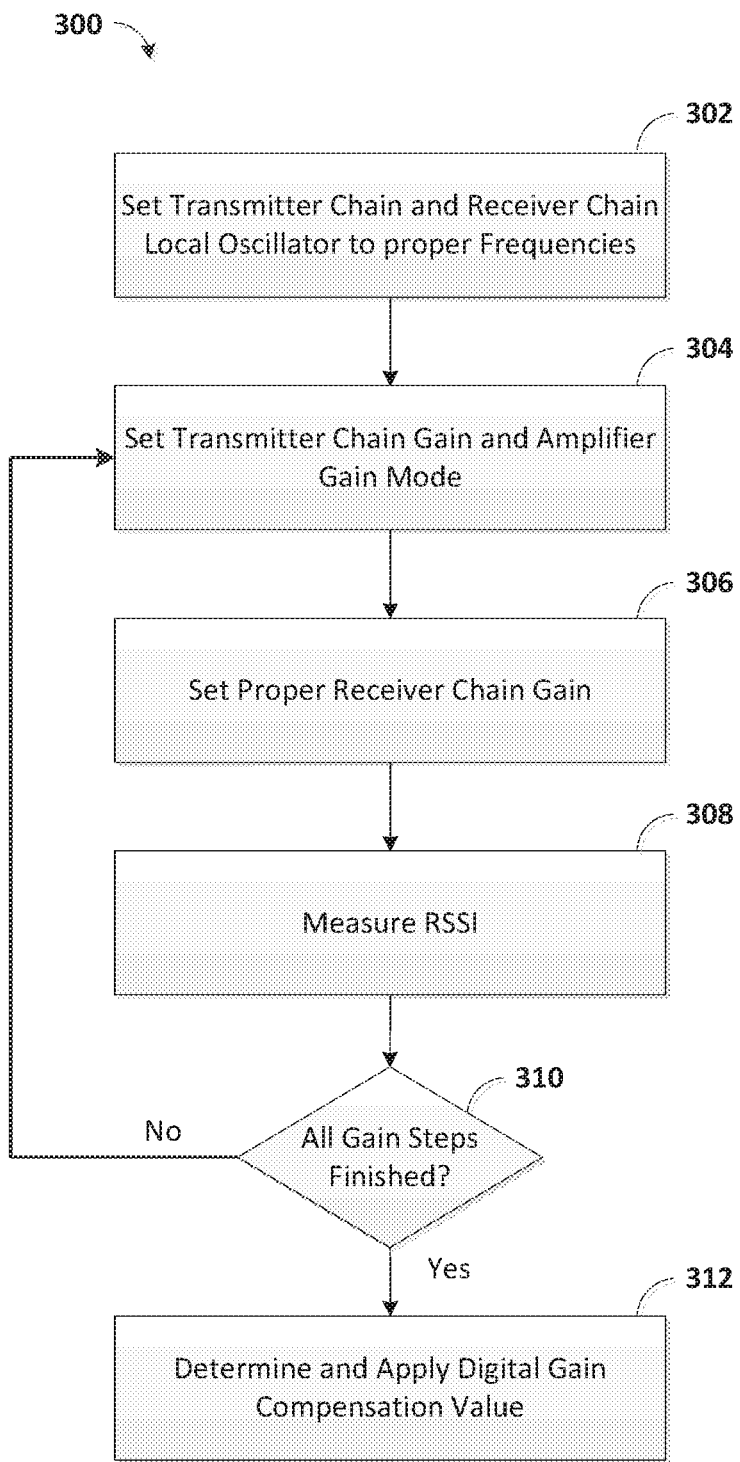
FIG. 3 shows a method of transceiver self calibration.

As a particular example, FIG. 3 shows a method 300 for self calibrating a transmitter chain output power in a transceiver. In block 302, a transmitter chain (e.g., the transmitter chain 102) and a receiver chain (e.g., the receiver chain 104) can be enabled and set to particular frequencies. As an example, a calibration control state machine (e.g., the calibration control state machine 108) set the transmitter chain and the receiver chain.

In block 304, a gain of the transmitter chain and an amplifier gain mode can be set to particular values from among one or more gain steps. In some aspects, the calibration control state machine can set the gain value.

In block 306, a power of the receiver chain can be set, for example, by adjusting a power signal provided to one or more of an amplifier and a local oscillator in the receiver chain. The receiver chain can receive a test signal based on the set offset frequency and the set power.

In block 308, the receiver chain can measure the received test signal. In an aspect, measuring the received test signal can comprise measuring a received signal strength indicator (RSSI) of the test signal. In some aspects, the RSSI can be measured by a baseband processor. In other aspects, the RSSI can be measured by a DFE in the receiver chain.

In block 310, it can be determined whether each of the one or more gain steps has been tested. If fewer than all of the one or more gain steps have been tested, the method can return to block 304. Once all of the one or more gain steps have been tested, the method can proceed to block 312.

In block 312, a digital gain compensation value can be determined. In some aspects, the digital gain compensation value can be determined based on one or more (e.g., each) of the one or more measured RSSI values. The determined digital gain compensation value can be applied to the transmitter chain by the calibration control state machine.

As another example, the transceiver 100 can self calibrate filter corners associated with the filter 116. Due to imperfections in the semiconductor manufacturing process, the transmitter filter corner can be offset relative to a value expected. During transmitter filter corner self-calibration, the test signal generator 128 of the baseband processor 106 is used to generate test tones at several offset frequencies, which are then transmitted via the transmitter chain 102. The receiver chain 104 is used to determine (e.g., calculate) an RSSI value for each of the test signals. After all of the RSSI values have been determined, actual rejection point information (e.g., 3 dB corner frequency) of the filter 116 can be found based on the RSSI measurements. Using the actual rejection point information, an error in the filter corner can be calculated, and a compensation value can be applied by the calibration control state machine 108 onto electrical components (e.g., capacitors and/or resistors) inside the filter 116.

Figure 4:
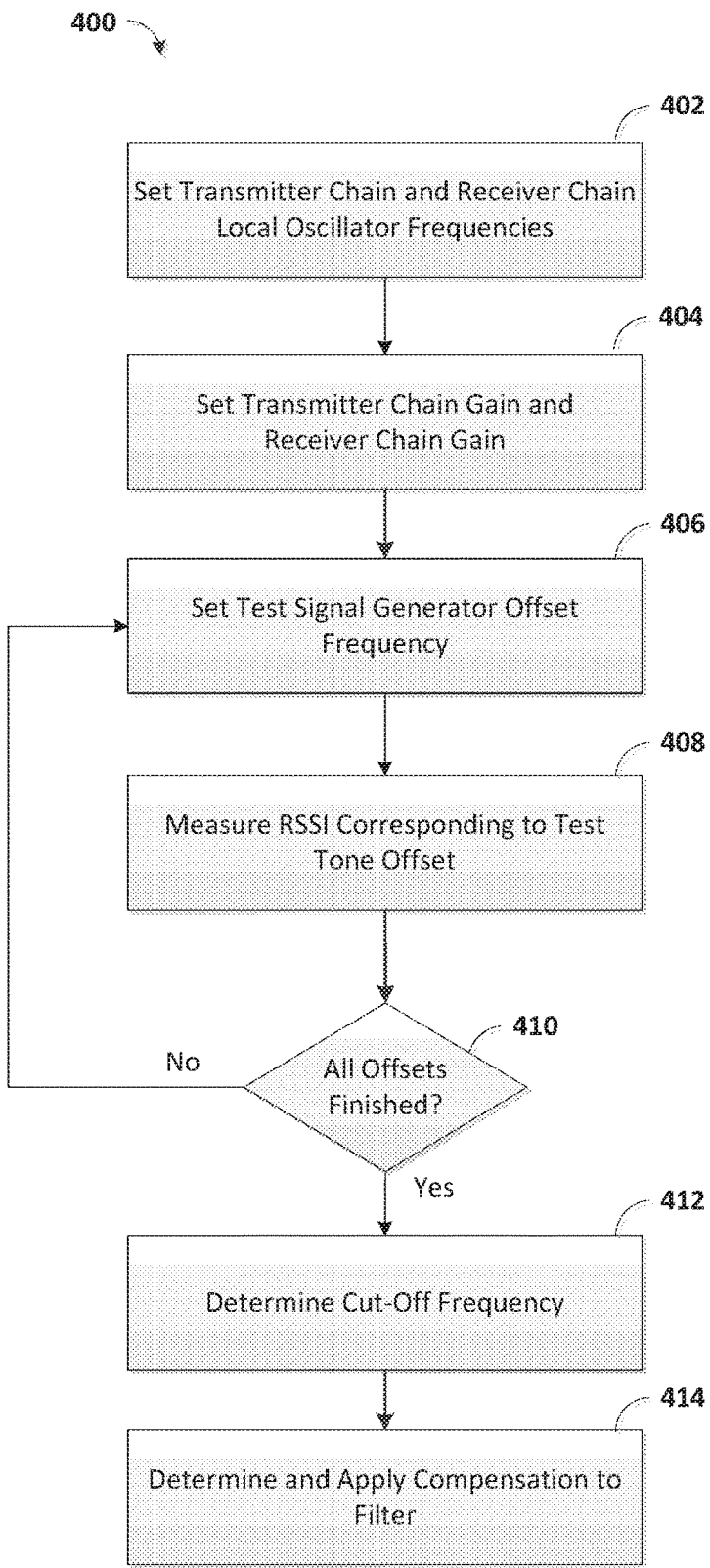
FIG. 4 shows a method of transceiver self calibration.

As an example, FIG. 4 shows a method 400 for self calibrating a filter corner of a transmitter chain in a transceiver. In block 402, a transmitter chain (e.g., the transmitter chain 102) and a receiver chain (e.g., the receiver chain 104) can be enabled and set to particular frequencies. As an example, a calibration control state machine (e.g., the calibration control state machine 108) set the transmitter chain and the receiver chain In block 404, a gain of the transmitter chain and a gain of the receiver chain can be set. In an aspect, the calibration control state machine can set the transmitter chain and/or the gain of the receiver chain.

In block 406, a test signal generator (set to output a tone) can be set to a tone offset from among a plurality of offsets. The transmitter chain can transmit a test signal based on the tone offset.

In block 408, an RSSI value of the test signal can be measured. In an aspect the test signal can be received b the receiver chain, and the RSSI value can be measured using one or more of the receiver chain and a baseband processor.

In block 410, it can be determined whether each of the one or more offsets has been tested. If fewer than all of the one or more offsets have been tested, the method can return to block 406. Once all of the one or more offsets have been tested, the method can proceed to block 412.

At block 412, an actual rejection point of a filter in the transmitter can be determined. In some aspects, the actual rejection point can be determined based on the one or more RSSI values.

At block 414, the actual rejection point of the filter can be compared to an ideal rejection point (e.g., a 3 dB cut-off frequency). A filter compensation value can be determined based on the difference between the actual rejection point and the ideal rejection point. As a particular example, the calibration control state machine can determine the filter compensation value. The filter compensation value can then be applied to a filter in the transmitter chain. In some aspects, applying the filter compensation value can comprise modifying one or more capacitors and/or one or more resistors in the filter.

As another example, local oscillator (LO) leakage, an unwanted artifacts of RF systems caused by residual Direct Current (DC) offsets and RF coupling inside the mixer, can be reduced through self calibration. Multiple (e.g., four) trial DC offset values can be used to calculate a DC offset. The trial DC offset values can be any values, and need not be close to the actual DC offset value. Receiver chain RSSI values associated with each of the multiple trial values can be measured. A linear equation with 4 unknowns can be solved to obtain the compensation values on I and Q channels.

As a particular example, the trial offset values applied onto I/Q channel can be denoted as [x,y], in which x is the offset for I and y is the offset for Q. Four measurements are made. For example, the LO leakage power measured with [0,0] trial offset input is $M_0$ (linear scale), and with [x, y] trial offset LO leakage is $M_1$, [x, -y] corresponds to $M_2$, and finally [-x, y] corresponds to $M_3$ LO leakage energy. Because LO leakage power is measured through a leakage path, an absolute power of the measurement cannot be used to calculate the true I/Q offset, only relative changes of power are used in the following calculations. Two intermediate variables are introduced:

$$\alpha = \frac{M_1}{M_0} - \frac{M_2}{M_0} \text{ and } \beta = \frac{M_1}{M_0} - \frac{M_3}{M_0}$$

$\alpha$ and $\beta$ are measurements of relative change in LO leakage power, caused by the trial offset input. By using the following equations, the true offset on I/Q channel can be found:

$$\begin{cases} I_{offset} = \frac{4\alpha\beta xy^2}{\alpha\beta^2 y^2 + \alpha^3 x^2} \\ Q_{offset} = \frac{4\alpha^2 x^2 y}{\alpha\beta^2 y^2 + \alpha^3 x^2} \end{cases}$$

Figure 5:
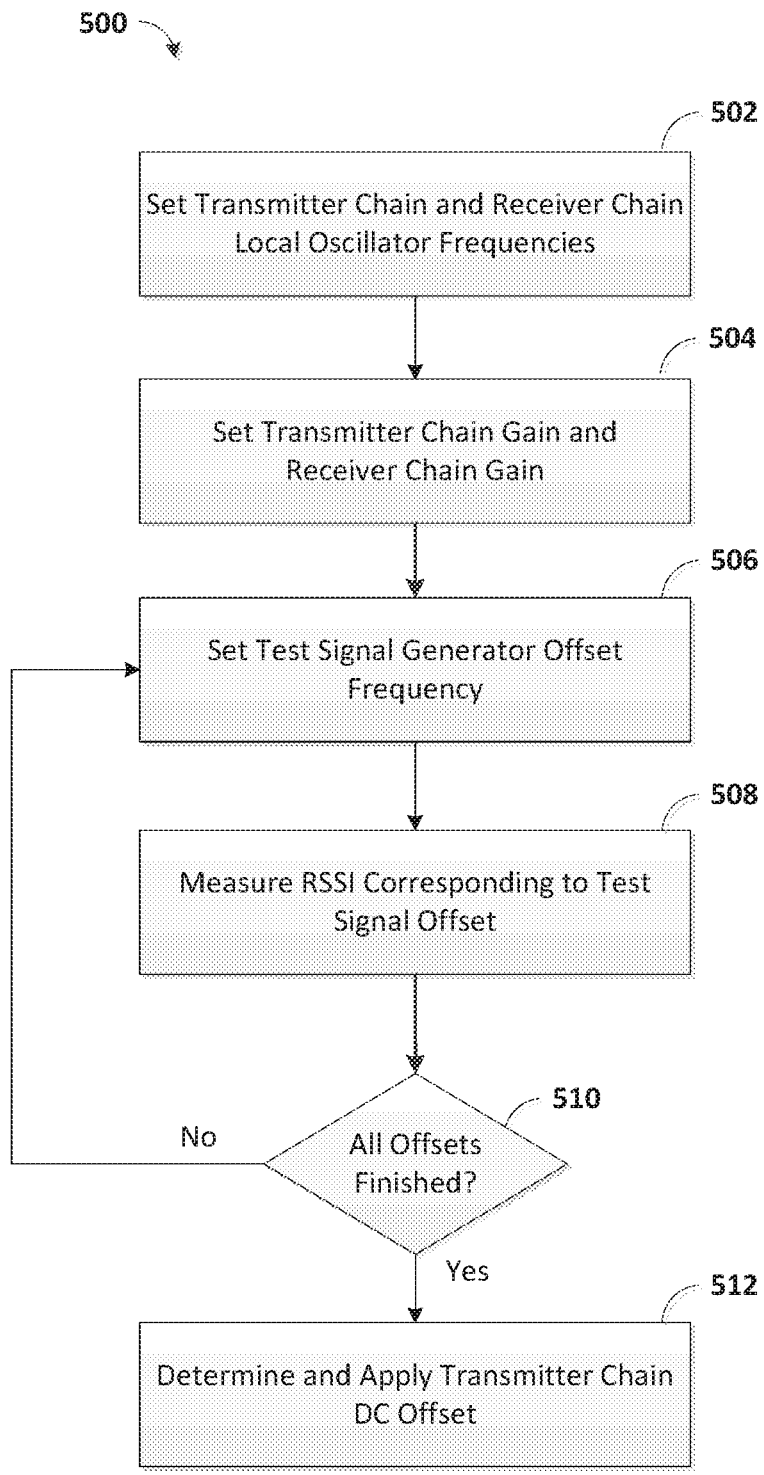
FIG. 5 shows a method of transceiver self calibration.

As a particular example, FIG. 5 shows a method 500 for self calibrating a DC offset to compensate for local oscillator leakage of a transmitter chain in a transceiver. In block 502, a transmitter chain (e.g., the transmitter chain 102) and a receiver chain (e.g., the receiver chain 104) can be enabled and set to particular frequencies. As an example, a calibration control state machine (e.g., the calibration control state machine 108) set the transmitter chain and the receiver chain.

In block 504, a gain of the receiver chain can be set. In some aspects, the gain of the transmitter chain can be set as well. In an aspect, the calibration control state machine can set the gain of the receiver chain and/or the transmitter chain.

In block 506, a test signal generator (set to output a tone) can be set to an offset frequency from among a plurality of offset frequencies. In some aspects, the plurality of offset frequencies can be based on, for example, a guess regarding the offset needed to compensate for the LO leakage. In some aspects one or more of the plurality of offset frequencies can be selected arbitrarily, and one or more offset frequencies can be selected based on one or more of the other selected offset values. In some aspects, the plurality of offset frequencies can comprise exactly or at least four offset frequencies. The test tone can be transmitted by the transmitter chain.

In block 508, the transmitted test tone can be received at the receiver chain, and an RSSI value corresponding to a transmitter chain LO leakage can be measured. In some aspects, the RSSI value can be measured by one or more of a DFE in the receiver chain and a baseband processor.

In block 510, it can be determined whether each of the one or more offsets has been tested. If fewer than all of the one or more offsets have been tested, the method can return to block 506. Once all of the one or more offsets have been tested, the method can proceed to block 512.

In block 512, a transmitter chain DC offset can be determined (e.g., calculated). In some aspects, the DC offset can be determined based on one or more (e.g., each) of the measured RSSI values. In an aspect, the DC offset can be determined separately for in-phase and quadrature channels. In some aspects, the DC offset can be applied to the transmitter chain. For example, the DC offset can be applied to a DFE (e.g., the DFE 114) in the transmitter chain.

In another example, a transmitter chain ACLR can be optimized using a particular mixer configuration comprising a combination of Mixer Bias Current settings, Mixer Gain settings, and Digital Gain back-off settings. A transmitter chain 102 and/or a test signal generator 128 can generate a test signal (e.g. a typical cellular transmit signal), which can be received at the receiver chain 104. The transmitter chain 102 can iterate through a plurality of mixer settings associated with a mixer in the DFE 114 while the receiver chain receives the test signal. A transmitter chain ACLR level can be measured inside receiver chain 104, while the transmitter chain iterates through the transmitter chain mixer configurations. After the iteration, an optimal mixer configuration (e.g., a configuration with the minimal difference between the measured ACLR level and a target ACLR level) can be selected. The mixer settings corresponding to an ACLR level nearest the target ACLR level can be applied to a mixer within the DFE 114. In some aspects, the nearest can be the nearest without exceeding the target, the lowest (e.g., the target ACLR value is zero), and/or the like.

Figure 6:
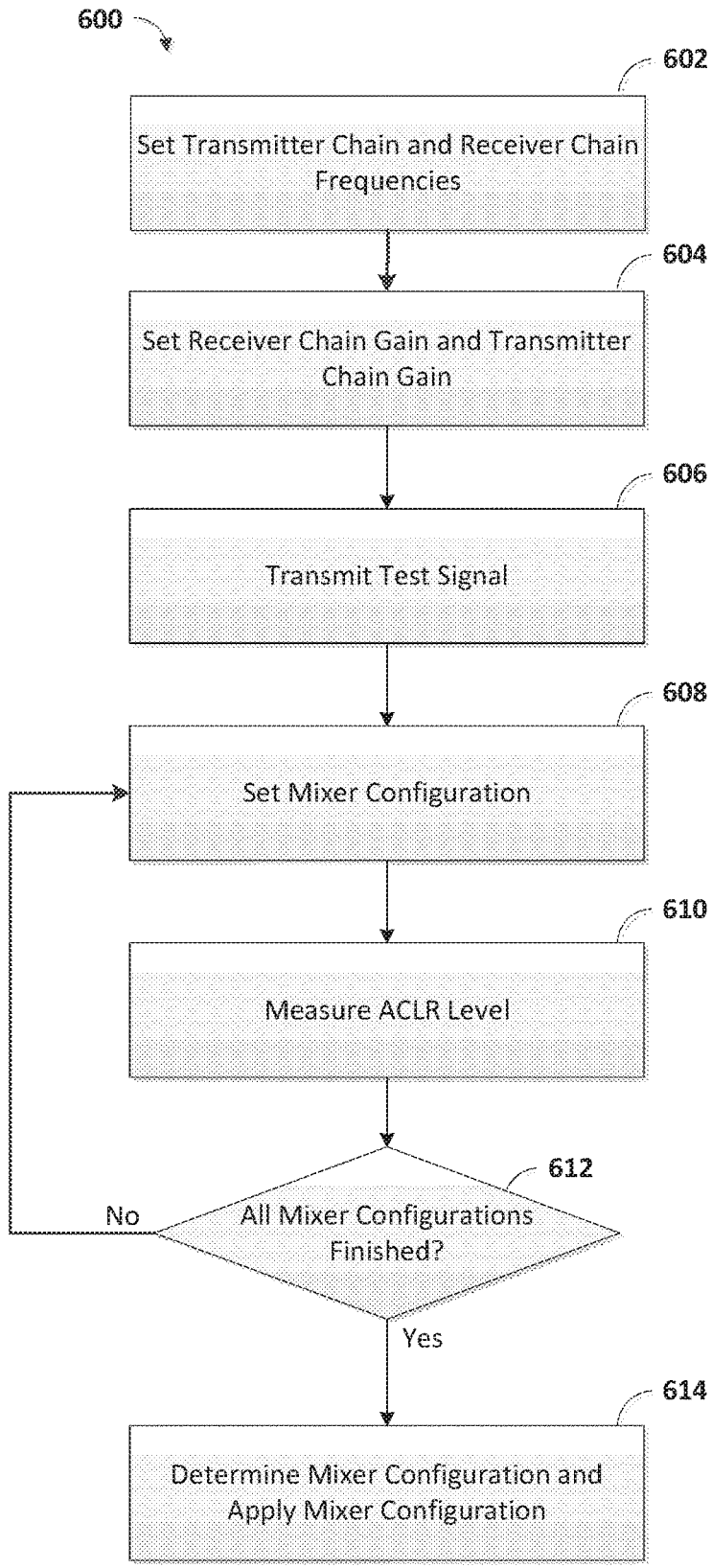
FIG. 6 shows a method of transceiver self calibration.

As a particular example, FIG. 6 shows a method 600 for self calibrating an ACLR value of a transmitter chain in a transceiver. In block 602, a receiver chain (e.g., the receiver chain 104) can be set to a predetermined frequency by, for example, a calibration control state machine (e.g., the calibration control state machine 108). The calibration control state machine can further set a transmitter chain (e.g., the transmitter chain 102) to generate a test signal at a predefined offset frequency. In some aspects, the offset frequency can be based on a predefined receiver frequency.

In block 604, the calibration control state machine can set a gain associated with the receiver chain and a gain associated with the transmitter chain.

In block 606, the transmitter chain can transmit a test signal based on the offset and the power. The receiver chain can receive the signal. For example, a test signal can be generated by a test signal generator (e.g., the test signal generator 128) and transmitted through the transmitter chain.

In block 608, one of a plurality of predefined mixer configurations can be applied to a mixer disposed within a DFE (e.g., the DFE 114) in the transmitter chain. In some aspects, the mixer configurations can be transmitted to the DFE comprising the mixer by the calibration control state machine. In some aspects, the mixer configuration can comprise one or more of mixer bias current settings, mixer gain settings, and digital gain back-off settings.

In block 610, an ACLR value associated with the applied mixer configuration can be measured. In some aspects, the ACLR value can be measured by the DFE and transmitted to the calibration control state machine.

In block 612, it is determined whether all of the plurality of predefined mixer configurations have been tested. If less than all of the predefined mixer configurations have been tested, the method returns to block 608. Otherwise, the method continues to block 614.

In block 614, it is determined which of the plurality of mixer configurations is associated with the ACLR value closest to a target ACLR value. In some aspects, the closest can be the closest without exceeding the target, the closest being less than the target, the lowest (e.g., the target intermodulation product power is zero), and/or the like.

While the methods and systems have been described in connection with embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its blocks be performed in a specific order. Accordingly, where a method claim does not actually recite an order to be followed by its blocks or it is not otherwise specifically stated in the claims or descriptions that the blocks are to be limited to a specific order, it is no way intended that an order be inferred, in any respect. This holds for any possible non-express basis for interpretation, including: matters of logic with respect to arrangement of blocks or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A self-calibrating transceiver, comprising:
   a transmitter chain comprising a digital front end (DFE);
   a receiver chain;
   a base band processor comprising a test signal generator; and
   a calibration control state machine in electrical communication with the transmitter chain, the receiver chain, and the base band processor, the calibration control state machine being configured for enabling the receiver chain and for setting the receiver chain and the transmitter chain to corresponding frequencies;
   the calibration control state machine being further configured for storing one or more transmitter power and power amplifier gain mode settings; and for each setting, setting the transmitter gain and power amplifier gain mode; the transmitter chain transmitting a signal, the receiver chain receiving the transmitted signal, and the base band processor measuring a received signal strength indicator (RSSI) of the received signal;
   the calibration control state machine being further configured for adjusting the transmitter output power based on the measured RSSI;
   the calibration control state machine being further configured for calibrating the receiver based on a plurality of test tones generated by the test signal generator, wherein a phase/gain imbalance associated with each of the plurality of test tones is stored;
   for each of the plurality of test tones distributed within a spectrum of interest, the test signal generator being configured for generating the test tone, compensating the receiver based on the stored phase/gain imbalance associated with the test tone, and measuring a transmitter phase/gain imbalance associated with the test tone at the base band processor; and
   the calibration control state machine being configured for receiving the plurality of measured transmitter phase/gain imbalances from the base band processor determining a compensation value based on the transmitter phase/gain imbalance and transmitting the compensation value to the DFE.

2. The self-calibrating transceiver of claim 1, wherein adjusting the transmitter output power comprises selecting one of the one or more stored gain codes based on the measured RSSI.

3. The self-calibrating transceiver of claim 1, wherein adjusting the transmitter output power comprises the calibration control state machine providing a digital gain to the DFE based on the measured RSSI.

4. The self-calibrating transceiver of claim 1, wherein determining the compensation value comprises:
   determining a constant compensation matrix based on the stored transmitter phase/gain imbalances; and
   determining a constant time delay difference based on the stored transmitter phase/gain imbalances.

5. The self-calibrating transceiver of claim 1, wherein the DFE comprises a programmable complex equalizer, and wherein determining the compensation value comprises
   generating one or more settings for a programmable complex equalizer based on the one or more determined phase and gain imbalance values; and
   applying the generated settings to the programmable complex equalizer.

6. The self-calibrating transceiver of claim 1, further comprising one or more test signal offsets stored at the calibration control state machine;
   wherein for each of the one or more test signal offsets, generating a test tone in the base band processor based on the offset, receiving the test tone at the receiver chain, measuring a test tone RSSI value associated with the offset using the base band processor, and transmitting the measured RSSI value to the calibration control state machine;
   wherein the calibration control state machine is configured for determining a cut-off frequency corresponding to the measured test tone RSSI values and adjusting one or more of a capacitor value and a resistor value in the transmitter chain based on the determined cut-off frequency.

7. The self-calibrating transceiver of claim 1, wherein the calibration control state machine is configured for setting a transmitter signal generator to generate a signal;
   for each of one or more predefined configurations of a mixer, measuring an adjacent channel leakage ratio (ACLR) value at the receiver chain and transmitting the measured ACLR value to the calibration control state machine; and
   wherein the calibration control state machine is configured for transmitting one of the one or more configurations of the mixer from the calibration control state machine to the DFE based on the measured ACLR value.

8. The self-calibrating transceiver of claim 7, wherein the applied one of the one or more configurations corresponds to a measured ACLR value nearest to a predefined target value.

9. A self-calibrating transceiver, comprising:
a transmitter chain comprising a digital front end (DFE);
a receiver chain;
a base band processor; and
a calibration control state machine in electrical communication with the transmitter chain, the receiver chain, and the base band processor, the calibration control state machine being configured for enabling the receiver chain and for setting the receiver chain and the transmitter chain to corresponding frequencies;
the calibration control state machine being further configured for storing a plurality of trial offset values for a direct current offset adder;
for each of the plurality of stored trial offset values, transmitting the offset to a direct current offset adder, transmitting a test signal, receiving the test signal at the receiver chain, measuring a received signal strength indicator (RSSI) value at the base band processor; and transmitting the measured RSSI value to the calibration control state machine;
the calibration control state machine being further configured for determining a direct current transmitter offset based on the measured RSSI values and applying the determined offset to the DFE.

10. The self-calibrating transceiver of claim 9, further comprising one or more test signal offsets stored at the calibration control state machine;
wherein for each of the one or more test signal offsets, generating a test tone in the base band processor based on the offset, receiving the test tone at the receiver chain, measuring a test tone RSSI value associated with the offset using the base band processor, and transmitting the measured RSSI value to the calibration control state machine;
wherein the calibration control state machine is configured for determining a cut-off frequency corresponding to the measured test tone RSSI values and adjusting one or more of a capacitor value and a resistor value in the transmitter chain based on the determined cut-off frequency.

11. The self-calibrating transceiver of claim 9, further comprising a test signal generator;
wherein the calibration control state machine is configured for setting a transmitter signal generator to generate a signal;
for each of one or more predefined configurations of a mixer, measuring an adjacent channel leakage ratio (ACLR) value at the receiver chain and transmitting the measured ACLR value to the calibration control state machine; and
wherein the calibration control state machine is configured for transmitting one of the one or more configurations of the mixer from the calibration control state machine to the DFE based on the measured ACLR value.

12. The self-calibrating transceiver of claim 11, wherein the applied one of the one or more configurations corresponds to a measured ACLR value nearest to a predefined target value.

13. The self-calibrating transceiver of claim 9, wherein the base band processor further comprises a test signal generator;
wherein the calibration control state machine is configured for calibrating the receiver based on a plurality of test tones generated by the test signal generator, wherein a phase/gain imbalance associated with each of the plurality of test tones is stored;
for each of the plurality of test tones distributed within a spectrum of interest, generating the test tone at the test signal generator, compensating the receiver based on the stored phase/gain imbalance associated with the test tone, and measuring a transmitter phase/gain imbalance associated with the test tone at the base band processor; and
wherein the calibration control state machine is configured for receiving the plurality of measured transmitter phase/gain imbalances from the base band processor determining a compensation value based on the transmitter phase/gain imbalance and transmitting the compensation value to the DFE.

14. The self-calibrating transceiver of claim 13, wherein determining the compensation value comprises:
determining a constant compensation matrix based on the stored transmitter phase/gain imbalances; and
determining a constant time delay difference based on the stored transmitter phase/gain imbalances.

15. The self-calibrating transceiver of claim 13, wherein the DFE comprises a programmable complex equalizer, and wherein determining the compensation value comprises
generating one or more settings for a programmable complex equalizer based on the one or more determined phase and gain imbalance values; and
applying the generated settings to the programmable complex equalizer.

16. A self-calibrating transceiver, comprising:
a transmitter chain comprising a digital front end (DFE) and a direct current offset adder;
a receiver chain;
a base band processor; and
a calibration control state machine in electrical communication with the transmitter chain, the receiver chain, and the base band processor, the calibration control state machine being configured for enabling the receiver chain and for setting the receiver chain and the transmitter chain to corresponding frequencies;
the calibration control state machine being further configured for storing one or more transmitter power and power amplifier gain mode settings and a plurality of trial offset values for the direct current offset adder;
for each of the one or more transmitter power and power amplifier gain mode settings, setting the transmitter gain and power amplifier gain mode; the transmitter chain transmitting a signal, the receiver chain receiving the transmitted signal; and the base band processor measuring a first received signal strength indicator (RSSI) of the received signal;
the calibration control state machine being further configured for adjusting the transmitter output power based on the measured first RSSI
for each of the plurality of stored trial offset values, transmitting the offset to a direct current offset adder, transmitting a test signal, receiving the test signal at the receiver chain; measuring a second RSSI value at the base band processor, and transmitting the measured second RSSI value to the calibration control state machine;

the calibration control state machine being further configured for determining a direct current transmitter offset based on the measured second RSSI values and applying the determined offset to the DFE.

17. The self-calibrating transceiver of claim 16, further comprising one or more test signal offsets stored at the calibration control state machine;
   wherein for each of the one or more test signal offsets, generating a test tone in the base band processor based on the offset, receiving the test tone at the receiver chain, measuring a test tone RSSI value associated with the offset using the base band processor, and transmitting the measured RSSI value to the calibration control state machine;
   wherein the calibration control state machine is configured for determining a cut-off frequency corresponding to the measured test tone RSSI values and adjusting one or more of a capacitor value and a resistor value in the transmitter chain based on the determined cut-off frequency.

18. The self-calibrating transceiver of claim 17, wherein the base band processor further comprises a test signal generator;
   wherein the calibration control state machine is configured for calibrating the receiver based on a plurality of test tones generated by the test signal generator, wherein a phase/gain imbalance associated with each of the plurality of test tones is stored;
   for each of the plurality of test tones distributed within a spectrum of interest, generating the test tone at the test signal generator, compensating the receiver based on the stored phase/gain imbalance associated with the test tone, and measuring a transmitter phase/gain imbalance associated with the test tone at the base band processor; and
   wherein the calibration control state machine is configured for receiving the plurality of measured transmitter phase/gain imbalances from the base band processor determining a compensation value based on the transmitter phase/gain imbalance and transmitting the compensation value to the DFE.

19. The self-calibrating transceiver of claim 18, further comprising a test signal generator;
   wherein the calibration control state machine is configured for setting a transmitter signal generator to generate a signal;
   for each of one or more predefined configurations of a mixer, measuring an adjacent channel leakage ratio (ACLR) value at the receiver chain and transmitting the measured ACLR value to the calibration control state machine; and
   wherein the calibration control state machine is configured for transmitting one of the one or more configurations of the mixer from the calibration control state machine to the DFE based on the measured ACLR value.

* * * * *